(12) United States Patent  
Jin et al.

(10) Patent No.: US 11,252,615 B2  
(45) Date of Patent: Feb. 15, 2022

(54) HANDOVER METHOD THAT IS BASED ON DC AND DEVICE

(71) Applicant: HUAWEI TECHNOLOGIES CO., LTD., Guangdong (CN)

(72) Inventors: Yinghao Jin, Shanghai (CN); Wei Tan, Shanghai (CN); Feng Han, Shanghai (CN)

(73) Assignee: HUAWEI TECHNOLOGIES CO., LTD., Guangdong (CN)

(*) Notice: Subject to any disclaimer, the term of this patent is extended or adjusted under 35 U.S.C. 154(b) by 0 days.

(21) Appl. No.: 16/713,489

(22) Filed: Dec. 13, 2019

(65) Prior Publication Data

US 2020/0120548 A1    Apr. 16, 2020

Related U.S. Application Data

(63) Continuation of application No. PCT/CN2018/087427, filed on May 18, 2018.

(30) Foreign Application Priority Data

Jun. 16, 2017   (CN) .......................... 201710459804.1

(51) Int. Cl.
*H04W 4/00*    (2018.01)
*H04W 36/00*   (2009.01)
*H04W 60/04*   (2009.01)

(52) U.S. Cl.
CPC ... *H04W 36/0016* (2013.01); *H04W 36/0027* (2013.01); *H04W 36/0069* (2018.08); *H04W 60/04* (2013.01)

(58) Field of Classification Search
CPC ............. H04W 28/0226; H04W 36/00; H04W 36/0005; H04W 36/0016; H04W 36/0058;
(Continued)

(56) References Cited

U.S. PATENT DOCUMENTS

2011/0116478 A1* 5/2011 Zhang ............... H04W 36/0055
                                                370/331
2014/0241317 A1* 8/2014 Jamadagni ............ H04W 40/36
                                                370/331
(Continued)

FOREIGN PATENT DOCUMENTS

CN        103052116 A      4/2013
CN        103874128 A      6/2014
(Continued)

OTHER PUBLICATIONS

Ericsson: "O ms support during handover procedure in NR",3GPP Draft; R2-1704434,May 14, 2017 (May 14, 2017), XP051275007,total 6 pages.

(Continued)

*Primary Examiner* — Matthew W Genack
(74) *Attorney, Agent, or Firm* — Womble Bond Dickinson (US) LLP

(57) ABSTRACT

This application provides a handover method that is based on DC, including: sending, by a source base station, a handover request to a target base station, where the handover request carries a target base station user equipment (UE) aggregate maximum bit rate (UE-AMBR) and/or network slice information of UE; and receiving, by the source base station, a handover request feedback sent by the target base station. A UE capability is coordinated between the source base station and the target base station, so that it is ensured that a technical effect of the UE capability is not exceeded during a DC-based handover. The coordination of the UE capability may be implemented by the source base station, or may be implemented by the target base station.

20 Claims, 8 Drawing Sheets

(58) Field of Classification Search
CPC ....... H04W 36/0083; H04W 36/00837; H04W 36/0085; H04W 40/36; H04M 15/8038
See application file for complete search history.

(56) References Cited

U.S. PATENT DOCUMENTS

| | | | |
|---|---|---|---|
| 2016/0007255 A1* | 1/2016 | Sharma | H04W 36/08 370/331 |
| 2017/0026982 A1 | 1/2017 | Koskinen et al. | |
| 2017/0034756 A1* | 2/2017 | Faccin | H04W 28/0268 |
| 2018/0332523 A1* | 11/2018 | Faccin | H04W 36/0033 |

FOREIGN PATENT DOCUMENTS

| | | |
|---|---|---|
| CN | 104509167 A | 4/2015 |
| CN | 104955109 A | 9/2015 |
| CN | 105009678 A | 10/2015 |
| CN | 105472659 A | 4/2016 |
| CN | 106664597 A | 5/2017 |
| CN | 105122880 B | 12/2018 |

OTHER PUBLICATIONS

Nokia Networks et al., "Open issue resolution of UE-AMBR",3GPP TSG-RAN WG3 Meeting #85 R3-141675, Dresden, Germany, Aug. 18-22, 2014,Total 6 Pages.

LG Electronics Inc: "UE-AMBR derivation", 3GPP Draft; R3-171449,May 14, 2017 (May 14, 2017), XP051276241, total 6 pages.

LG Electronics Inc., "Mobility procedure considering network slice",3GPP TSG-RAN WG3 Meeting #95bis R3-171129, Spokane, Washington, USA, 3 Apr. 7, 2017,Total 4 Pages.

LG Electronics Inc: "TP for UE-AMBR derivation in Xn procedure",3GPP Draft; R3-171587,May 14, 2017 (May 14, 2017), XP051276373,total 3 pages.

* cited by examiner

HANDOVER METHOD THAT IS BASED ON DC AND DEVICE

CROSS-REFERENCE TO RELATED APPLICATIONS

This application is a continuation of International Application No. PCT/CN2018/087427, filed on May 18, 2018, which claims priority to Chinese Patent Application No. 201710459804.1, filed on Jun. 16, 2017. The disclosures of the aforementioned applications are hereby incorporated by reference in their entireties.

TECHNICAL FIELD

This application relates to the field of communications technologies, and in particular, to a handover method that is based on dual connectivity (DC) and a device.

BACKGROUND

In an existing communications network, a handover process is mainly divided into three parts: a handover preparation phase, a handover execution phase, and a handover completion phase. In the entire handover execution phase, there is no connection between a user equipment (UE) and a source base station (source eNB/gNB) (that is, in the phase, the connection between the UE and the source base station is broken). However, in this case, no connection is established between the UE and a target base station (target eNB/gNB). Therefore, in the phase, the UE cannot receive any data from a network side, and consequently a data interruption or a handover latency are caused. To resolve a handover latency problem, a concept of a handover that is based on DC is introduced in a discussion of a next-generation network. Simply, the DC-based handover means that in the handover process, the UE maintains a connection to the source base station while establishing a connection to the target base station, to ensure an uninterrupted handover. However, because the source base station and the target base station simultaneously communicate with the UE, a problem that a UE capability is exceeded may occur in communication.

SUMMARY

This application provides a handover method that is based on DC and a device, and a UE capability is coordinated between a source base station (or source cell) and a target base station (or target cell) by using the source base station and/or the target base station, so that technical issues of the UE capability are not exceeded during a DC-based handover. The UE capability may include a UE aggregate maximum bit rate (UE-AMBR) and network slice information of UE. In brief, coordinating a UE-AMBR means that the UE-AMBR is properly allocated between the source base station (or source cell) and the target base station (or target cell). By coordinating the UE-AMBR, it is ensured that during a DC handover, the UE-AMBR is not exceeded when the source base station (or source cell) and the target base station (or target cell) simultaneously communicate with the UE. Coordinating network slice information of UE is mutually notifying a network side of a largest quantity of at least one network slice currently allowed to be accessed by the UE, a largest quantity of network slices supported by the UE, or a largest quantity of network slices that can be simultaneously accessed by the UE. The network slice information of the UE is coordinated, so that the target base station (or target cell) can verify access of the UE, and the target base station (or target cell) finds a more suitable target cell (or target base station) for the UE during a next handover. In addition, in this application, whether DC is used and a type of DC used for a handover may be determined by the source base station or the target base station. In this case, flexibility of a DC handover may be improved. At the same time, information exchanged in a handover process may further include a GPRS tunneling protocol, a GPRS tunneling protocol (GTP) tunnel port identifier of each data radio bearer (drb). The tunnel port identifier is used by the target base station to transmit an uplink packet data convergence protocol (PDCP) data packet, for example, a PDCP packet data unit (PDU) to the source base station, or used by the source base station to transmit a downlink PDCP data packet, for example, a PDCP PDU to the target base station; and the information exchanged in the handover process may further include timing information or trigger information that is used to instruct the UE to release a connection to the source base station after a preset time arrives or a preset trigger condition is satisfied, thereby saving an air interface resource.

According to a first aspect, a handover method that is based on dual connectivity DC is provided, where the handover method includes: sending, by a source base station, a handover request to a target base station, where the handover request carries a target base station UE aggregate maximum bit rate UE-AMBR and/or network slice information of UE; and receiving, by the source base station, a handover request feedback sent by the target base station.

In one embodiment, the target base station UE-AMBR is obtained by the source base station based on a received UE-AMBR.

In one embodiment, the target base station UE-AMBR is an AMBR during communication between the target base station and the UE; and the network slice information includes an allowed network slice indicator or a supported largest quantity of network slices.

In one embodiment, the allowed network slice indicator is used to indicate at least one network slice that a network side allows the UE to access in a registration area or a tracking area to which a source cell belongs; and the supported largest quantity of network slices is a largest quantity of network slices supported by the UE or a largest quantity of network slices that can be simultaneously accessed by the UE.

In one embodiment, the handover request further carries at least one of a handover type identifier, a GPRS tunneling protocol, or a GTP tunnel port identifier of the target base station, which is based on each drb, and the handover type identifier is used to indicate that a handover is a DC-based handover.

In one embodiment, the handover request feedback carries the GTP tunnel port identifier, of the target base station, that is based on each drb.

In one embodiment, after the receiving, by the source base station, a handover request feedback sent by the target base station, the handover method further includes: sending, by the source base station, a handover message to the UE.

In one embodiment, the handover message carries one or more of the following information: a handover type identifier, timing information, and trigger information, where the handover type identifier is used to indicate that a handover is a DC-based handover, the timing information is used to instruct the UE to release a connection to the source base station after a preset time arrives, and the trigger information is used to indicate a trigger condition of releasing, by the UE, the connection to the source base station.

According to a second aspect, a handover method that is based on DC is provided, where the handover method includes: receiving, by a target base station, a handover request sent by a source base station, where the handover request carries a target base station UE-AMBR and/or network slice information of UE; and establishing, by the target base station, communication with the UE based on the target base station UE-AMBR and/or the network slice information.

In one embodiment, after the receiving, by a target base station, a handover request sent by a source base station, the handover method further includes: sending, by the target base station, a handover request feedback to the source base station, where the handover request feedback carries a GTP tunnel port identifier, of the target base station, that is based on each drb.

In one embodiment, the target base station UE-AMBR is an AMBR during communication between the target base station and the UE; and the network slice information includes an allowed network slice indicator or a supported largest quantity of network slices.

In one embodiment, the allowed network slice indicator is used to indicate at least one network slice that a network side allows the UE to access in a registration area or a tracking area to which a source cell belongs; and the supported largest quantity of network slices is a largest quantity of network slices supported by the UE or a largest quantity of network slices that can be simultaneously accessed by the UE.

In one embodiment, the handover request further carries at least one of a handover type identifier, a GPRS tunneling protocol, or a GTP tunnel port identifier of the target base station, which is based on each drb, and the handover type identifier is used to indicate that a handover is a DC-based handover.

According to a third aspect, a handover method that is based on DC is provided, where the handover method includes: sending, by UE, a measurement report to a source base station; receiving, by the UE, a handover message sent by the source base station, where the handover message carries one or more of the following information: a handover type identifier, timing information, and trigger information. The handover type identifier is used to indicate that a handover is a DC-based handover, the timing information is used to instruct the UE to release a connection to the source base station after a preset time arrives, and the trigger information is used to indicate a trigger condition of releasing, by the UE, the connection to the source base station.

According to a fourth aspect, a handover method that is based on DC is provided, where the handover method includes: receiving, by a target base station, a handover request sent by a source base station; and sending, by the target base station, a handover request feedback to the source base station based on the handover request, where the handover request feedback carries a source base station UE-AMBR, and the source base station UE-AMBR is an AMBR during communication between the source base station and the UE.

In one embodiment, the handover request carries at least one of a handover type identifier, a GPRS tunneling protocol, or a GTP tunnel port identifier of the source base station, which is based on each drb, and the handover type identifier is used to indicate that a handover is a DC-based handover.

In one embodiment, the handover request feedback further carries at least one of a handover type identifier or a GTP tunnel port identifier of the target base station, which is based on each drb, and the handover type identifier is used to indicate that a handover is a DC-based handover.

In one embodiment, the handover type identifier is determined by the target base station based on a UE capability.

In one embodiment, the source base station UE-AMBR is obtained by the target base station based on a received UE-AMBR that is sent by the source base station or the UE.

According to a fifth aspect, a handover method that is based on DC is provided, where the handover method includes: sending, by a source base station, a handover request to a target base station, where the handover request carries a UE-AMBR; receiving, by the source base station, a handover request feedback sent by the target base station, where the handover request feedback carries the source base station UE-AMBR; and maintaining, by the source base station, a connection to UE based on the source base station UE-AMBR.

In one embodiment, the handover request carries one or more of the following information: a handover type identifier, network slice information of the UE, a GPRS tunneling protocol, and a GTP tunnel port identifier, of the source base station, that is based on each drb. The handover type identifier is used to indicate that a handover is a DC-based handover.

In one embodiment, after the receiving, by the source base station, a handover request feedback sent by the target base station, the handover method further includes: sending, by the source base station, a handover message to the UE.

In one embodiment, the handover message carries one or more of the following information: a handover type identifier, timing information, and trigger information. The handover type identifier is used to indicate that a handover is a DC-based handover, the timing information is used to instruct the UE to release a connection to the source base station after a preset time arrives, and the trigger information is used to indicate a trigger condition of releasing, by the UE, the connection to the source base station.

According to a sixth aspect, a base station supporting a DC handover is provided, where the base station includes: a receiver, a transmitter, a memory, and a processor, where the memory stores an instruction. When the processor executes the instruction, the following operations are performed: sending, by the transmitter, a handover request to a target base station, where the handover request carries a target base station UE-AMBR and/or network slice information of UE; and receiving, by the receiver, a handover request feedback sent by the target base station.

In one embodiment, the target base station UE-AMBR is obtained by the processor based on a UE-AMBR received by the receiver.

In a possible implementation of the sixth aspect, the target base station UE-AMBR is an AMBR during communication between the target base station and the UE; and the network slice information includes an allowed network slice indicator or a supported largest quantity of network slices.

In one embodiment, the allowed network slice indicator is used to indicate at least one network slice that a network side allows the UE to access in a registration area or a tracking area to which a source cell belongs; and the supported largest quantity of network slices is a largest quantity of network slices supported by the UE or a largest quantity of network slices that can be simultaneously accessed by the UE.

In one embodiment, the handover request further carries at least one of a handover type identifier, a GPRS tunneling protocol, or a GTP tunnel port identifier of the target base station, which is based on each drb, and the handover type identifier is used to indicate that a handover is a DC-based handover.

In one embodiment, the handover request feedback carries the GTP tunnel port identifier, of the target base station, that is based on each drb.

In one embodiment, after the receiving, by the receiver, a handover request feedback sent by the target base station, the transmitter is further configured to send a handover message to the UE.

In one embodiment, the handover message carries one or more of the following information: a handover type identifier, timing information, and trigger information. The handover type identifier is used to indicate that a handover is a DC-based handover, the timing information is used to instruct the UE to release a connection to the source base station after a preset time arrives, and the trigger information is used to indicate a trigger condition of releasing, by the UE, the connection to the source base station.

According to a seventh aspect, a base station supporting a DC handover is provided, where the base station includes: a receiver, a transmitter, a memory, and a processor, where the memory stores an instruction. When the processor executes the instruction, the following operations are performed: receiving, by the receiver, a handover request sent by a source base station, where the handover request carries a target base station UE-AMBR and/or network slice information of UE; and establishing, by the receiver and the transmitter, communication with the UE based on the target base station UE-AMBR and/or the network slice information.

In one embodiment, the transmitter is further configured to send a handover request feedback to the source base station, and the handover request feedback carries a GTP tunnel port identifier, of the target base station, that is based on each drb.

In one embodiment, the target base station UE-AMBR is an AMBR during communication between the target base station and the UE; and the network slice information includes an allowed network slice indicator or a supported largest quantity of network slices.

In one embodiment, the allowed network slice indicator is used to indicate at least one network slice that a network side allows the UE to access in a registration area or a tracking area to which a source cell belongs; and the supported largest quantity of network slices is a largest quantity of network slices supported by the UE or a largest quantity of network slices that can be simultaneously accessed by the UE.

In one embodiment, the handover request further carries at least one of a handover type identifier, a GPRS tunneling protocol, or a GTP tunnel port identifier of the target base station, which is based on each drb, and the handover type identifier is used to indicate that a handover is a DC-based handover.

According to an eighth aspect, DC-based UE is provided, where the UE includes: a transceiver, a memory, and a processor, where the memory stores an instruction. When the processor executes the instruction, the following operations are performed: sending, by the transceiver, a measurement report to a source base station; receiving, by the transceiver, a handover message sent by the source base station. The handover message carries one or more of the following information: a handover type identifier, timing information, and trigger information. The handover type identifier is used to indicate that a handover is a DC-based handover, the timing information is used to instruct the UE to release a connection to the source base station after a preset time arrives, and the trigger information is used to indicate a trigger condition of releasing, by the UE, the connection to the source base station.

According to a ninth aspect, a base station performing a handover based on DC is provided, where the base station includes: a receiver, a transmitter, a memory, and a processor, where the memory stores an instruction. When the processor executes the instruction, the following operations are performed: receiving, by the receiver, a handover request sent by a source base station; and sending, by the transmitter, a handover request feedback to the source base station based on the handover request, where the handover request feedback carries a source base station UE-AMBR, and the source base station UE-AMBR is an AMBR during communication between the source base station and the UE.

In one embodiment, the handover request carries at least one of a handover type identifier, a GPRS tunneling protocol, or a GTP tunnel port identifier of the source base station, which is based on each drb, and the handover type identifier is used to indicate that a handover is a DC-based handover.

In one embodiment, the handover request feedback further carries at least one of a handover type identifier or a GTP tunnel port identifier of the target base station, which is based on each drb, and the handover type identifier is used to indicate that a handover is a DC-based handover.

In one embodiment, the handover type identifier is determined by the processor based on a UE capability.

In one embodiment, the source base station UE-AMBR is obtained by the processor based on a UE-AMBR that is received by the receiver and that is sent by the source base station or the UE.

According to a tenth aspect, a base station performing a handover based on DC is provided, where the base station includes: a receiver, a transmitter, a memory, and a processor, where the memory stores an instruction, and when the processor executes the instruction, the following operations are performed: sending, by the transmitter, a handover request to a target base station, where the handover request carries a UE-AMBR; receiving, by the receiver, a handover request feedback sent by the target base station, where the handover request feedback carries a source base station UE-AMBR; and maintaining, by the transmitter, a connection to UE based on the source base station UE-AMBR.

In one embodiment, the handover request carries one or more of the following information: a handover type identifier, network slice information of the UE, a GPRS tunneling protocol, and a GTP tunnel port identifier, of the source base station, that is based on each drb. The handover type identifier is used to indicate that a handover is a DC-based handover.

In one embodiment, the transmitter is further configured to send a handover message to the UE, where the handover message carries one or more of the following information: a handover type identifier, timing information, and trigger information. The handover type identifier is used to indicate that a handover is a DC-based handover, the timing information is used to instruct the UE to release a connection to the source base station after a preset time arrives, and the trigger information is used to indicate a trigger condition of releasing, by the UE, the connection to the source base station.

According to an eleventh aspect, a readable-storage medium is provided, and includes an instruction, where the instruction is run to implement the method according to one or more of the following aspects: the first aspect, the second aspect, the fourth aspect, and the fifth aspect.

According to a twelfth aspect, a readable-storage medium is provided, and includes an instruction, where the instruction is run to implement the method according to the third aspect.

According to a thirteenth aspect, a computer program product is provided, and includes an instruction. When the computer program product is run on a computer, the computer is enabled to perform the method according to one or more of the following aspects: the first aspect, the second aspect, the fourth aspect, and the fifth aspect.

According to a fourteenth aspect, a computer program product is provided, and includes an instruction. When the computer program product is run on a computer, the computer is enabled to perform the method according to the third aspect.

According to a fifteenth aspect, a system is provided, and includes the base station according to the fifth aspect and the sixth aspect.

According to a sixteenth aspect, a system is provided, and includes the base station according to the eighth aspect and the ninth aspect.

According to a seventeenth aspect, a dual connectivity DC-based base station is provided, where the base station includes:

a sending unit, configured to send a handover request to a target base station, where the handover request carries a target base station UE aggregate maximum bit rate UE-AMBR and/or network slice information of UE UE; and a receiving unit, configured to receive a handover request feedback sent by the target base station.

In one embodiment, the base station further includes an obtaining unit, where the obtaining unit is configured to obtain the target base station UE-AMBR based on a received UE-AMBR.

In one embodiment, the target base station UE-AMBR is an AMBR during communication between the target base station and the UE; and the network slice information includes an allowed network slice indicator or a supported largest quantity of network slices.

In one embodiment, the allowed network slice indicator is used to indicate at least one network slice that a network side allows the UE to access in a registration area or a tracking area to which a source cell belongs; and the supported largest quantity of network slices is a largest quantity of network slices supported by the UE or a largest quantity of network slices that can be simultaneously accessed by the UE.

In one embodiment, the handover request further carries at least one of a handover type identifier, a GPRS tunneling protocol, or a GTP tunnel port identifier of the target base station, which is based on each drb, and the handover type identifier is used to indicate that a handover is a DC-based handover.

In one embodiment, the handover request feedback carries the GTP tunnel port identifier, of the target base station, that is based on each drb.

In one embodiment, the sending unit is further configured to send a handover message to the UE. The handover message carries one or more of the following information: a handover type identifier, timing information, and trigger information. The handover type identifier is used to indicate that a handover is a DC-based handover, the timing information is used to instruct the UE to release a connection to a source base station after a preset time arrives, and the trigger information is used to indicate a trigger condition of releasing, by the UE, the connection to the source base station.

According to an eighteenth aspect, a base station performing a handover based on DC is provided, where the base station includes: a receiving unit, configured to receive a handover request sent by a source base station, where the handover request carries a target base station UE-AMBR and/or network slice information of UE; and a communication establishment unit, configured to establish communication with the UE based on the target base station UE-AMBR and/or the network slice information.

In one embodiment, the base station further includes a sending unit that is configured to send a handover request feedback to the source base station, and the handover request feedback carries a GTP tunnel port identifier, of the target base station, that is based on each drb.

In one embodiment, the target base station UE-AMBR is an AMBR during communication between the target base station and the UE; and the network slice information includes an allowed network slice indicator or a supported largest quantity of network slices.

In one embodiment, the allowed network slice indicator is used to indicate at least one network slice that a network side allows the UE to access in a registration area or a tracking area to which a source cell belongs; and the supported largest quantity of network slices is a largest quantity of network slices supported by the UE or a largest quantity of network slices that can be simultaneously accessed by the UE.

According to a nineteenth aspect, UE performing a handover based on DC is provided, where the UE includes: a sending unit, configured to send a measurement report to a source base station; and a receiving unit, configured to receive a handover message sent by the source base station. The handover message carries one or more of the following information: a handover type identifier, timing information, and trigger information. The handover type identifier is used to indicate that a handover is a DC-based handover, the timing information is used to instruct the UE to release a connection to the source base station after a preset time arrives, and the trigger information is used to indicate a trigger condition of releasing, by the UE, the connection to the source base station.

According to a twentieth aspect, a base station performing a handover based on DC is provided, where the base station includes: a receiving unit, configured to receive a handover request sent by a source base station; and a sending unit, configured to send a handover request feedback to the source base station. The handover request feedback carries a source base station UE-AMBR, and the source base station UE-AMBR is an AMBR during communication between the source base station and the UE.

In one embodiment, the handover request carries at least one of a handover type identifier, a GPRS tunneling protocol, or a GTP tunnel port identifier of the source base station, which is based on each drb, and the handover type identifier is used to indicate that a handover is a DC-based handover.

In one embodiment, the handover request feedback further carries at least one of a handover type identifier or a GTP tunnel port identifier of the target base station, which is based on each drb, and the handover type identifier is used to indicate that a handover is a DC-based handover.

In one embodiment, the base station further includes a determining unit. The determining unit is configured to determine the handover type identifier based on a UE capability.

In one embodiment, the base station further includes an obtaining unit. The obtaining unit is configured to obtain the source base station UE-AMBR based on a received UE-AMBR that is sent by the source base station or the UE.

According to a twenty-first aspect, a DC-based base station is provided, where the base station includes: a sending unit, configured to send a handover request, where the handover request carries a UE-AMBR; a receiving unit, configured to receive a handover request feedback sent by a target base station, where the handover request feedback carries a source base station UE-AMBR; and a connection maintaining unit, configured to maintain a connection to UE based on the source base station UE-AMBR.

In one embodiment, the handover request carries one or more of the following information: a handover type identifier, network slice information of the UE, a GPRS tunneling protocol, and a GTP tunnel port identifier, of the source base station, that is based on each drb. The handover type identifier is used to indicate that a handover is a DC-based handover.

In one embodiment, the sending unit is further configured to send a handover message to the UE. The handover message carries one or more of the following information: a handover type identifier, timing information, and trigger information. The handover type identifier is used to indicate that a handover is a DC-based handover, the timing information is used to instruct the UE to release a connection to the source base station after a preset time arrives, and the trigger information is used to indicate a trigger condition of releasing, by the UE, the connection to the source base station.

BRIEF DESCRIPTION OF DRAWINGS

To describe technical solutions in this application or the prior art more clearly, the following briefly introduces the accompanying drawings required by this application. Apparently, the accompanying drawings in the following description are some possible implementations of this application, and a person of ordinary skill in the art may further derive other drawings from the accompanying drawings without creative efforts.

DESCRIPTION OF EMBODIMENTS

Figure 1:
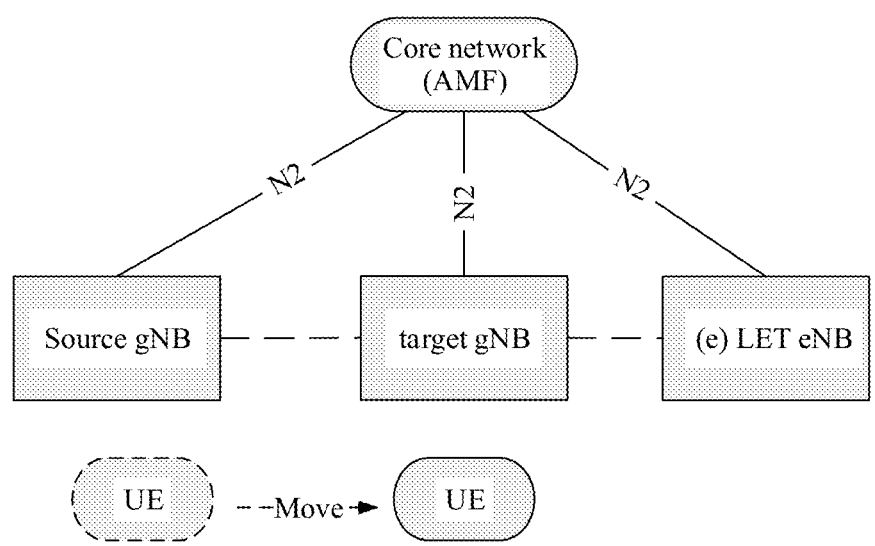
FIG. 1 is a schematic architectural diagram of a communications network to which this application is applicable.

The terms used in this application are merely for the purpose of describing a specific possible implementation, but are not intended to limit this application. The terms "a", "said" and "the" of singular forms used in this application and the appended claims are also intended to include plural forms, unless otherwise specified in the context clearly. It should also be understood that, the term "and/or" used herein indicates and includes any or all possible combinations of one or more associated listed items. It should be further understood that the term "include" adopted in the specification specifies presence of features, data, information, integers, steps, operations, elements and/or components, with presence or attachment of other features, data, information, integers, steps, operations, components, elements, and their combinations not excluded.

The following first explains some terms in this application, to facilitate understanding by a person skilled in the art.

1). A source base station is a base station that communicates with UE before a base station handover is performed. In an LTE network, the source base station may be referred to as a source eNB, and in 5G, namely, new radio (NR), the source base station may be referred to as a source gNB. A target base station is a base station that communicates with the UE after a base station handover is successfully performed. In the LTE network, the target base station may be referred to as a target eNB, and in 5G, namely, NR, the target base station may be referred to as a target gNB. It should be understood that the foregoing is merely an example of names of the source base station and the target base station. This is not limited in this application. In this application, a representation of the source base station sometimes includes a source base station (or source cell), and a representation of the target base station sometimes includes a target base station or a target cell. A person skilled in the art may understand specific meanings of the source base station and the target base station without departing from this application.

2). UE is a device that provides a user with voice and/or data connectivity, and may include various terminals, handheld devices, vehicle-mounted devices, wearable devices, or computing devices that have a wireless communication function, or another processing device connected to a wireless modem, and various forms of UEs, mobile stations (MS), transmission and receiver points (TRP or transmission point, TP), and the like.

3). A UE capability may include any one or more of the following: power control, a UE-AMBR, a code resource, a UE mode, calculation, a packet data convergence protocol (PDCP) capability, network slice information, and the like. These capabilities need to be known by the network, to facilitate management of a radio resource of the UE.

4). A UE-AMBR is one of user capabilities, and is also a QoS parameter. The UE-AMBR is used to represent a maximum aggregate bit rate allowed by all non-guaranteed bit rate (Non-GBR) services (for example, all streaming services) of UE. A target base station UE-AMBR is an AMBR at which the UE allows the target base station (or target cell) to communicate with the UE when the target base station (or target cell) communicates with the UE; and a source base station UE-AMBR is an AMBR at which the UE allows the source base station (or source cell) to communicate with the UE when the source base station (or source cell) communicates with the UE. The UE further maintains a connection to the source base station (or source cell) while establishing a connection to the target base station (or target cell), and a sum of the target base station UE-AMBR and the source base station UE-AMBR cannot exceed the UE-AMBR. Therefore, when the UE further maintains the connection to the source base station (or source cell) while establishing the connection to the target base station (or target cell), the source base station or the target base station needs to allocate the UE-AMBR to the source base station UE-AMBR or the target base station UE-AMBR.

5). Network slice information may include an allowed network slice indicator or a supported largest quantity of network slices. Network slice information of a base station may be sent by a core network, UE, or another base station to the base station. This is not limited in this application.

The supported largest quantity of network slices is a largest quantity of network slices supported by the UE or a largest quantity of network slices that can be simultaneously accessed by the UE, and indicates a capability of a UE network slice.

The allowed network slice indicator indicates at least one network slice that a network side allows the UE to access in a registration area (registration area) or a tracking area (tracking area) to which a source cell belongs, or at least one network slice that a network side for a public land mobile network (PLMN) allows the UE to access in a registration area or a tracking area to which a source cell belongs. The source cell is a cell that communicates with the UE and to which a source base station before a handover belongs. The allowed network slice indicator may be represented by using at least one of the following parameters:

1. Network slice identifiers:

1.1. Network slice type information: The network slice type information may be used to indicate network slice types such as an enhanced mobile broadband (eMBB) service, ultra-reliable low latency communications (URLLC), and massive machine type communication (mMTC); and in one embodiment, the network slice type information may further indicate an end-to-end network slice type, an ® AN-to-CN network slice type, a network ((R)AN) side network slice type, or a CN side network slice type.

1.2. Service type information: Related to a specific service. The service type information may indicate a feature of a service such as a video service, an Internet of Vehicles service, a voice service, or the like, or information about a specific service.

1.3. Tenant information: Used to indicate information about a customer, for example, Tencent or State Grid, who creates or rents the network slice.

1.4. User group information: Used to indicate group information of grouping users based on a feature such as a user level.

1.5. Slice group information: Used to indicate grouping of network slices based on a feature, for example, all network slices that can be accessed by UE may be grouped as a slice group, or based on another criterion.

1.6. Network slice instance information: Used to indicate an identifier and feature information of an instance created for the network slice. For example, an identifier used to indicate the network slice instance may be allocated to the network slice instance, or a new identifier associated with the network slice instance may be mapped based on the network slice instance identifier, and a receiving side may identify, based on the identifier, a specific network slice instance indicated by the identifier.

1.7. Dedicated core network (DCN) identifier: The identifier is used to uniquely indicate a dedicated core network in an LTE system or an eLTE system, for example, a dedicated core network in the Internet of Things. In one embodiment, mapping may be performed for the DCN identifier and a network slice identifier, the DCN identifier may be mapped by using the network slice identifier, and the DCN identifier may also be mapped by using the network slice identifier.

It should be understood that, if the network side allows the UE to access a plurality of network slices in the registration area (registration area) or the tracking area (tracking area) to which the source cell belongs, or the network side for a PLMN allows the UE to access a plurality of network slices in the registration area or the tracking area to which the source cell belongs, the allowed network slice indicator includes a plurality of allowed (allowed) network slice identifiers.

2. S-NSSAI: The S-NSSAI includes at least slice/service type (SST) information, and in one embodiment, may further include slice differentiator (SD) information. The SST information is used to indicate behavior of the network slice, for example, a feature and a service type of the network slice. The SD information is supplementary information of the SST, and if a plurality of network slice instances use the same SST, the SD may correspond to a unique network slice instance. It should be understood that, if the network side allows the UE to access a plurality of network slices in the registration area or the tracking area to which the source cell belongs, or the network side for a PLMN allows the UE to access a plurality of network slices in the registration area or the tracking area to which the source cell belongs, the allowed network slice indicator includes a plurality of allowed S-NSSAIs.

3. S-NSSAI group information: The S-NSSAI group information is used to instruct to perform grouping based on a feature. For example, all network slices of a common AMF that can be accessed by a UE device are grouped as an S-NSSAI group.

4. Temporary ID: The temporary ID is allocated by an AMF to UE already registered on a CN side, and the temporary ID may uniquely indicate an AMF.

5. R-NSSAI ((R)AN-NSSAI): The R-NSSAI represents a group of particular S-NSSAI. It should be understood that, if the network side allows the UE to access a plurality of network slices in the registration area or the tracking area to which the source cell belongs, or the network side for a PLMN allows the UE to access a plurality of network slices in the registration area or the tracking area to which the source cell belongs, the allowed network slice indicator may include a plurality of identifiers of sets of allowed R-NSSAI.

6. Allowed NSSAI: The NSSAI includes a plurality of pieces of S-NSSAI.

It should be understood that, a specific coding form of the allowed network slice indicator is not limited. Different fields of an interface message that may be carried between different devices separately represent different allowed network slice indicators, or may be replaced by an abstracted index value, and different index values separately correspond to different network slices. Certainly, in addition to the foregoing identifiers, the network slice information may also be another identifier. This is not limited herein. If the network side allows the UE to access a plurality of network slices, the allowed network slice indicator may be in a form of an allowed network slice indicator list, for example, an allowed network slice selection assistance information list (allowed NSSAI list), or an allowed single network slice selection assistance information list (allowed S-NSSAI list).

7). Exchange: The exchange in this application refers to a process in which two exchange parties transmit information to each other, and the information transferred herein may be the same or may be different. For example, when the two exchange parties are a source base station and a target base station, the source base station may request information from the target base station, and the target base station provides the information requested by the source base station for the source base station. Certainly, the source station and the base station may also request information from each other, and the information requested herein may be the same or may be different.

8). The nouns "network" and "system" are usually interchangeably used, but meanings of the nouns can be understood by a person skilled in the art. The terms "information (information)", "signal (signal)", "message (message)", and "channel (channel)" may be interchangeably used sometimes. It should be noted that expressed meanings of the terms may be consistent when differences are not emphasized. The terms "of (of)", "corresponding (corresponding, relevant)", "message (message)", and "corresponding (corresponding)" may be interchangeably used sometimes. It should be noted that expressed meanings of the terms are consistent when differences are not emphasized.

The following describes the technical solutions of this application with reference to the accompanying drawings.

FIG. 1 is a schematic architectural diagram of a communications network to which this application is applicable. In FIG. 1, a 5G network scenario in a wireless communications network is used as an example for description. It should be noted that the solutions in this application may be further applied to another wireless communications network, and a corresponding name may be replaced by a name of a corresponding function in the another wireless communications network. As shown in FIG. 1, a communications network mainly includes a (radio) access network ((R)AN) and a core network (CN). A control panel of the CN mainly has an access and mobility management function (AMF), and an effect of the AMF is similar to that of an MME in LTE. It should be noted that, in 5G, an evolved eNB (LTE base station) may also access a 5G core network, and support some functions of a 5G base station. Due to mobility of UE, the UE that is in a connected state and that is performing a session moves from a source base station (or source cell) to a target base station (or target cell), so that a handover process is generated. The source base station is a base station connected to the UE before the handover, and the target base station is a base station connected to the UE after the handover.

Figure 2:
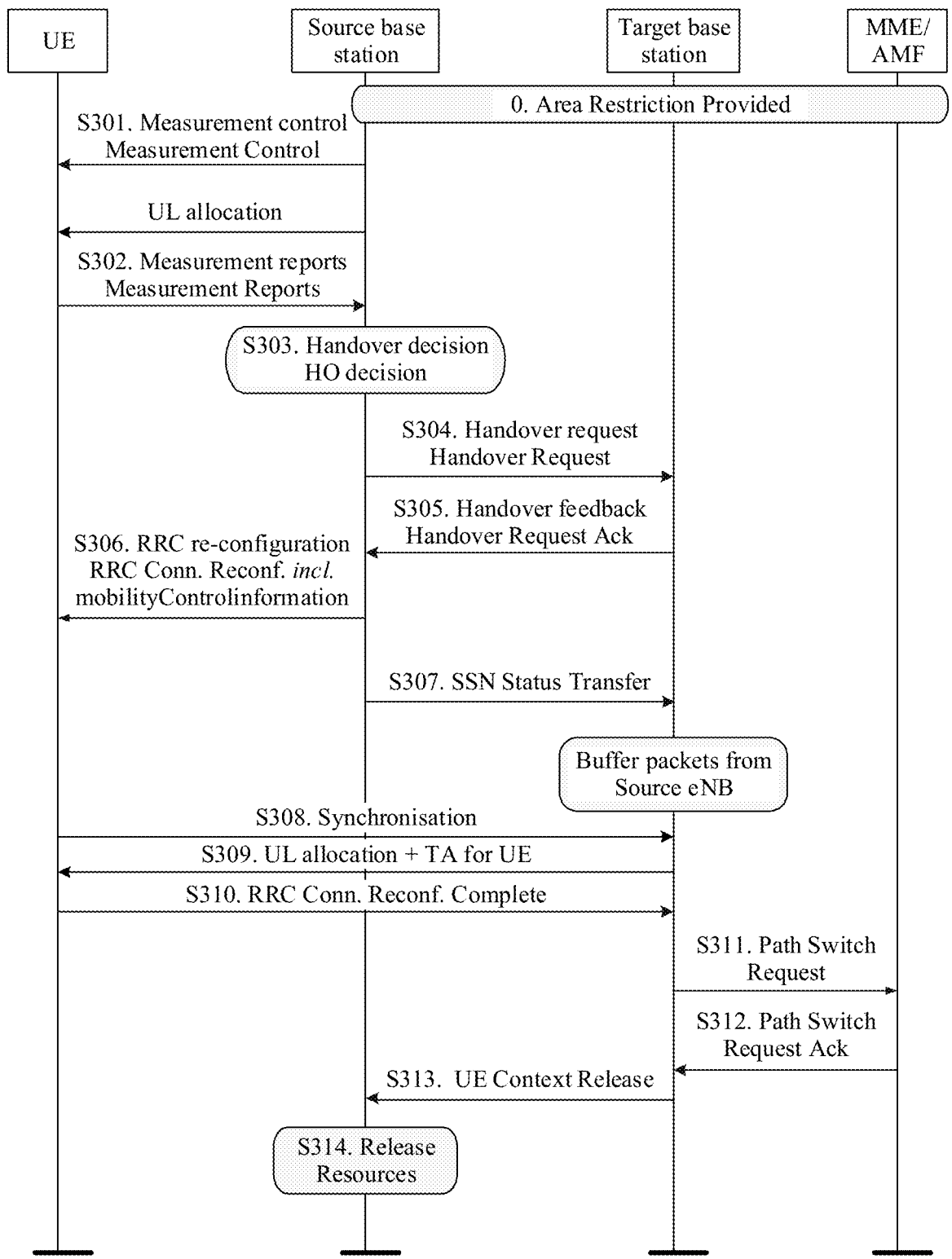
FIG. 2 is a schematic flowchart of a non-DC-based handover in the prior art.
Figure 3:
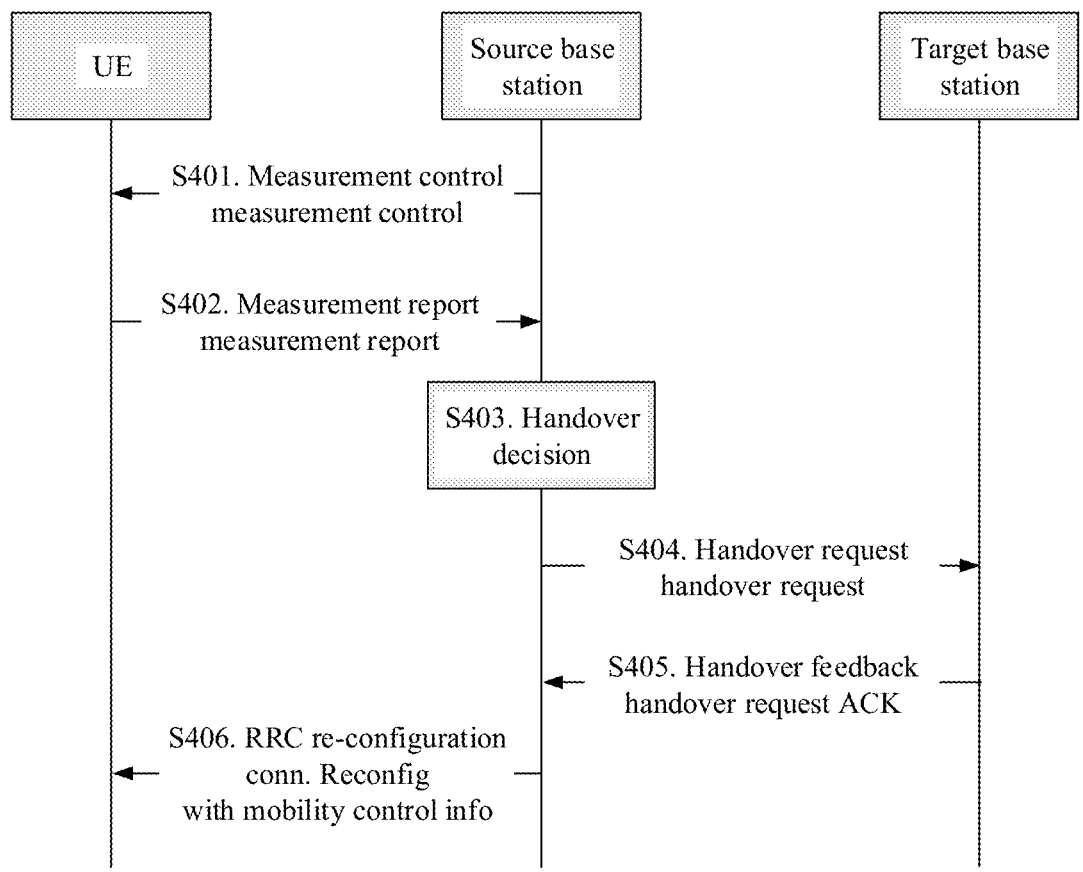
FIG. 3 is a schematic flowchart of a DC-based handover in the prior art.

FIG. 2 is a schematic flowchart of a non-DC-based handover in the prior art. For details, refer to chapter 10 in 3GPP TS 36.300. As shown in FIG. 2, an existing handover is mainly divided into three parts: a handover preparation phase (from S304 to S306), a handover execution phase (from S307 to S310), and a handover completion phase (from S311 to S314). In the entire handover execution phase, there is no connection between UE and a source base station (in other words, in this phase, the connection between the UE and the source base station is already disconnected). Specifically referring to a proposal of Ericsson in 3GPP: R2-1704434 0 ms support during handover procedure with dual Tx_Rx. As shown in FIG. 3, compared with the non-DC-based handover, in an existing DC-based handover, a main improvement of a handover procedure is that S406 is different from S306, and in S406, the UE needs to be notified that the handover is a DC-based handover, so that the UE continues to maintain the connection to the source base station in the handover execution process. The existing solution is only simple notification, and does not consider how a source base station and a target base station control dual connectivity.

Figure 4:
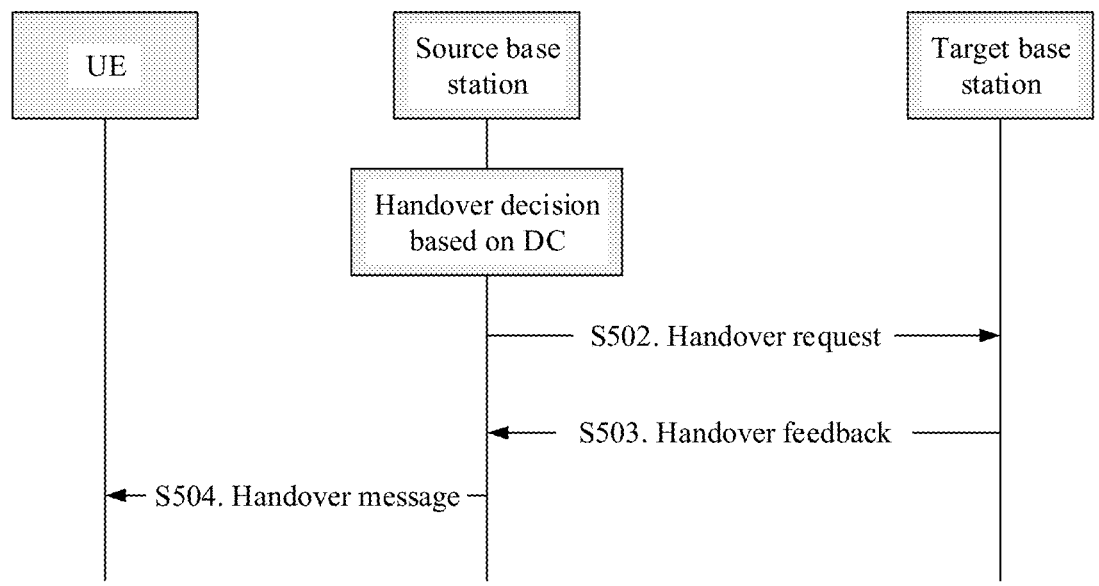
FIG. 4 is a schematic flowchart of a DC-based handover according to this application.

FIG. 4 is a schematic flowchart of a DC-based handover according to this application. As shown in FIG. 4, the handover method includes the following operations.

S502. Source base station sends a handover request to a target base station, where the handover request carries a target base station UE aggregate maximum bit rate UE-AMBR and/or network slice information of UE.

In one embodiment, the handover request may carry the target base station UE-AMBR (target gNB UE-AMBR), the target base station UE-AMBR is obtained by the source base station based on a received UE-AMBR, and the UE-AMBR may be sent by a core network, the UE, or another base station to the source base station. Specifically, the target base station UE-AMBR is obtained by the source base station based on the UE-AMBR, a measurement report, a resource usage status of the source base station, and/or the like. The target base station establishes a connection to the UE based on the target base station UE-AMBR, and the source base station maintains a connection to the UE based on a source base station UE-AMBR. For example, it is assumed that the UE-AMBR is 90 (bps). According to the measurement report, current spectral efficiency of the target base station is twice that of the source base station. In this case, the source base station obtains that there is a 2:1 relationship between the target base station UE-AMBR and the source base station UE-AMBR, to be specific, the target base station UE-AMBR is 60 (bps), and the source base station UE-AMBR is 30 (bps). For another example, the source base station may also obtain, based on the current resource usage status, a source base station UE-AMBR that is 20 (bps) and that can be provided by the source base station for the UE, and in this case, the source base station determines that the source base station UE-AMBR is 20 (bps) and the target base station UE-AMBR is 70 (bps). Through coordination by the source base station, a case in which the target base station and the source base station separately perform independent scheduling and the UE-AMBR is exceeded (where for example, the UE-AMBR is 50 (bps); and if the target base station does not know the case, the target base station allocates 40 (bps) to the UE, that is, the target base station UE-AMBR is 40 (bps), the source base station allocates 20 (bps) to the UE, that is, the source base station UE-AMBR is 20 (bps), and consequently, a sum of the two is finally greater than 50 (bps)) is avoided. Coordinating the UE-AMBR by using the source base station ensures a smooth DC-based handover.

In one embodiment, the handover request may carry the network slice information of UE. The network slice information is received by the source base station from a core network or the UE, or received from another base station, and the network slice information is sent to the target base station. In the existing technical solution, the target base station cannot obtain the information during a handover. After obtaining the network slice information, the target base station has the following technical effects: First, rights of the UE may be verified on an (R)AN side. For example, when the UE performs a radio resource control (RRC) connection request, if a carried network slice identifier does not fall within an identifier range allowed by a current network, the target base station may learn that the network slice identifier carried by the UE is an invalid identifier, and may reject the RRC connection request, or select a default AMF for the UE. Second, after obtaining the network slice information, the target base station may find a more suitable target cell or target base station for the UE during a next handover. For example, when the UE needs to perform a next handover, a network slice to which a session of the UE belongs is a network slice 1, and network slices that the current network allows the UE to access are the network slice 1, a network slice 2, and a network slice 3. In this case, when the UE needs to be handed over, when selecting a next target cell (or target base station) for the UE, the target base station (or target cell) (in this case, a target base station (or target cell) in a previous handover changes to a source base station (or source cell) in an upcoming handover) needs to consider a network slice that can be supported by the next target cell (or target base station). If a next target cell (or target base station) 1 supports the network slice 1, the network slice 2, and the network slice 3, and a next target cell (or target base station) 2 supports the network slice 1, the network slice 2, and a network slice 4, both the next target cell (or target base station) 1 and the next target cell (or target base station) 2 may be selected (or the same) if reference is made only to the network slice to which the current session of the UE belongs. However, if the network slices that the network allows the UE to access are considered, the target cell (or target base station) 1 may be preferentially selected as a next target, because the target cell (or target base station) may support more allowed network slices of the UE. Although the UE currently has no session of the network slice 3, the session may occur after the handover. If the UE is handed over to the next target cell (or target base station) 2, the target cell 2 does not support the UE in initiating the session of the network slice 3. However, the case does not occur when the UE is handed over to the next target cell (or target base station) 1. Third, the target base station receives a largest quantity of network slices supported by the UE or a largest quantity of network slices that can be simultaneously accessed by the UE. A session may be established for the UE based on the information, and if the UE hopes to establish a session in which a quantity of network slices exceeds the quantity, the target base station rejects the session.

In one embodiment, the handover request may further carry a GTP tunnel port identifier, of the source base station, that is based on each drb, the GTP tunnel port identifier is used by the target base station to transmit an uplink packet data convergence protocol (PDCP) packet data unit (PDU) to the source base station. The GTP tunnel port identifier needs to be carried, because a core network side connection has not been handed over from the source base station (or source cell) to the target base station within a period of time after the UE completes an air interface side connection to the target base station. In this phase, uplink data cannot be transmitted from the target base station to the core network, and if the GTP tunnel port identifier is carried in this case, the uplink data may be transmitted to the core network by using the source base station, thereby reducing a latency of uplink data transmission caused by the handover.

Figure 5A:
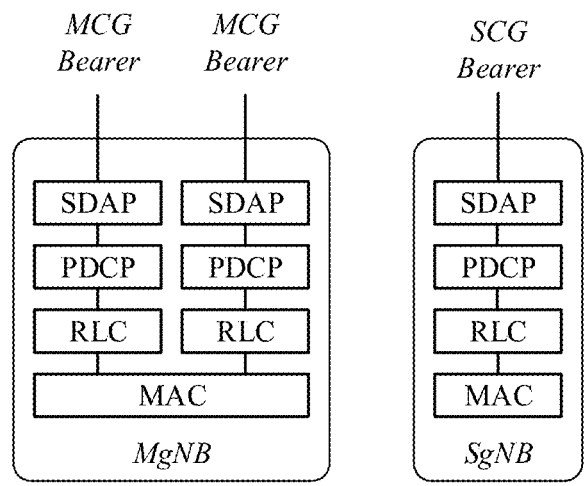
FIG. 5A and FIG. 5B and FIG. 5C are a schematic structural diagram of a protocol stack of a DC-based handover according to this application.
Figure 5B:
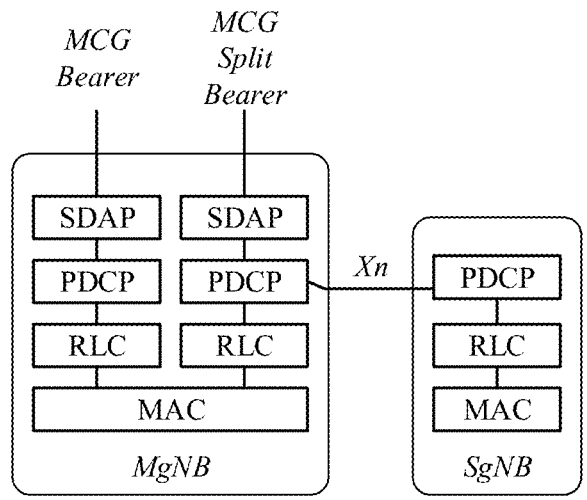
Figure 5C:
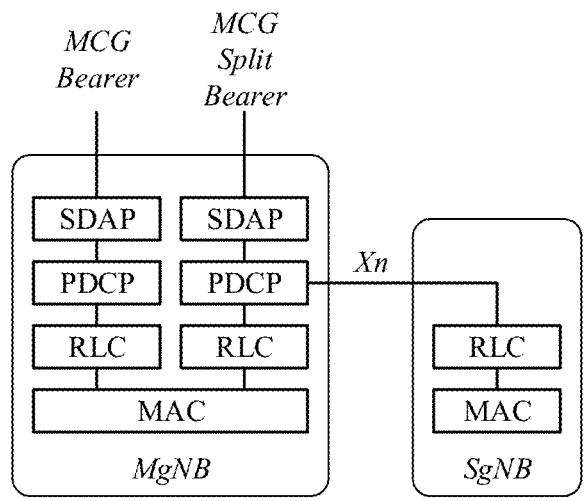

In one embodiment, the handover request may further carry a handover type identifier, and the handover type identifier is used to indicate that the handover is a DC-based handover. In one embodiment, the handover request may further indicate a type of DC that the handover is based on. The handover type identifier is carried, so that the target base station knows a protocol stack required for communication in a connection establishment process. The DC may include DC-1A, DC-1B, DC-3C, DC-3B, and the like. FIG. 5A and FIG. 5B and FIG. 5C are a schematic structural diagram of a protocol stack of a DC-based handover according to this application. As shown in FIG. 5A and FIG. 5B and FIG. 5C, a difference between different DC lies in different protocol stacks, namely, protocol stacks of the target base station that a data flow transmitted on the target base station (which may also be referred to as a second base station, second gNB, SgNB) passes through. In FIG. 5A and FIG. 5B and FIG. 5C, an MCG is a Master cell group, namely, a master cell group, and an SCG is a Second cell group, namely, a second cell group. Specifically, as shown in FIG. 5A, in DC-1A, protocol stacks that a data flow passes through in the target base station include the service data adaptation protocol (SDAP)/PDCP/RLC/MAC. As shown in FIG. 5B, in DC-3B, protocol stacks that a data flow passes through on the target base station include RLC, MAC, and a part of PDCP. As shown in FIG. 5 C, in DC-3C, protocol stacks that a data flow passes through in the target base station includes RLC and MAC, that is, the data transmitted by the target base station is transmitted to the target base station after being processed by SDAP and PDCP of the source base station (which may also be referred to as a first base station, a master base station, or an MgNB). Then, the data is processed and sent by RLC and MAC of the target base station.

S503. The source base station receives a handover request feedback sent by the target base station.

In one embodiment, the handover request feedback carries a GTP tunnel port identifier, of the target base station, that is based on each drb. The GTP tunnel port identifier is a GTP tunnel port identifier, of the target base station, for each received drb, and is used by the source base station to transmit a downlink PDCP PDU to the target base station. If a handover is based on the DC-3C, the GTP tunnel port identifier may be used to identify data of each drb, that is, identify a drb to which the data belongs. This is similar to the GTP tunnel port identifier carried in the handover request, so that a handover latency may be reduced.

In one embodiment, after the receiving, by the source base station, the handover request feedback sent by the target base station, the handover method of this application further includes: S504. The source base station sends a handover message to the UE, and the handover message may be a radio resource control RRC reconfiguration message or a handover command message.

In one embodiment, the handover message may include a handover type identifier that is used to indicate whether a handover is a DC-based handover, and in one embodiment, indicate a type of DC that the handover is based on, which is similar to the handover type identifier carried in the handover request. For details, refer to the description of the handover type identifier carried in the handover request. After the UE receives the handover type identifier, whether the handover is the DC-based handover and the type of DC that the handover is based on may be learned.

In one embodiment, the handover message may include timing information that is used to instruct the UE to release a connection to the source base station after a preset time arrives. The UE obtains, based on the timing information, a time for releasing the connection to the source base station, thereby avoiding releasing the connection only when a radio link failure occurs. Specifically, timer may be started after handover information sent by the source base station is received, and a terminal releases a connection to the source base station after the timer expires. Alternatively, the timer may be started after a terminal establishes a connection to the target base station, and the terminal releases a connection to the source base station after the timer expires. A start time of the timer is not specifically limited in this solution. When a radio link condition is relatively poor, there is no meaning for performing communication by using the source base station, because an air interface needs to be retransmitted for a plurality of times before transmission succeeds, and an air interface resource is wasted.

In one embodiment, the handover message may include trigger information, and the trigger information is used to indicate a trigger condition of releasing the connection to the source base station by the UE. The trigger condition may include a trigger condition or a trigger event. The trigger information is determined by the source base station or the target base station. This is not limited in this embodiment. If the trigger information is determined by the target base station, the trigger information needs to be carried in the handover request feedback, and sent by the source base station to the UE by using the handover message. For example, the trigger information instructs the UE to release the connection to the source base station after a signal received by the UE from the source base station is lower than a threshold; or the trigger information instructs the UE to release the connection to the source base station after a signal difference between signals that are of the source base station and the target base station and that are received by the UE reaches a threshold, or release the connection to the source base station when a radio link failure (radio link failure, RLF) occurs between the UE and the source base station; or the trigger information instructs the UE to release the connection to the source base station after a quantity of times of RLC retransmission between a terminal and the source base station reaches a particular threshold, or release the connection to the source base station when a quantity of times of out-of-synchronization between the UE and the source base station reaches a specified threshold. The connection is released in time, thereby avoiding a waste of an air interface resource.

It should be understood that the timing information or the trigger information may be used to terminate uplink data transmission between the UE and the source base station, or terminate downlink data transmission between the UE and the source base station, or may be used to simultaneously terminate uplink and downlink data transmission between the UE and the source base station.

The timing information or the trigger information may enable the UE to know when to release the connection to the source base station, thereby avoiding invalid air interface retransmission. If the UE does not receive the timing information or the trigger information, the UE does not know when to release the connection to the source base station, thereby causing invalid air interface retransmission. In one case, when the UE transmits uplink data to the source base station, a handover process may already be completed, in other words, the source base station has released a context of the UE, consequently all uplink transmission, of the UE, in which the UE context is released is invalid. However, if the UE receives the foregoing information, a similar case can be avoided. For example, if the source base station releases the UE context, an ACK of the uplink data is not fed back to the UE, and RLC retransmission is caused. After a quantity of RLC retransmission times reaches a particular threshold, the UE does not perform retransmission instead of keeping performing retransmission. In addition to the foregoing beneficial effects, if the UE is currently located in a heterogeneous network system, the target cell (or target base station) is a micro base station, and the source cell is a macro base station (macro gNB), the UE may move out of a current target cell (or target base station) within a short time and return to a source cell. If specified timing information does not exceed the time, the UE may continue to be served after returning to the source cell without a data interruption.

According to the foregoing handover procedure, the source base station coordinates a UE capability between the source base station and the target base station, shares network slice information, and explicitly specifies a type of DC that a handover is based on. Therefore, a handover latency is reduced, a waste of an air interface resource is avoided, and a DC-based handover is comprehensively improved in a plurality of aspects.

Figure 6:
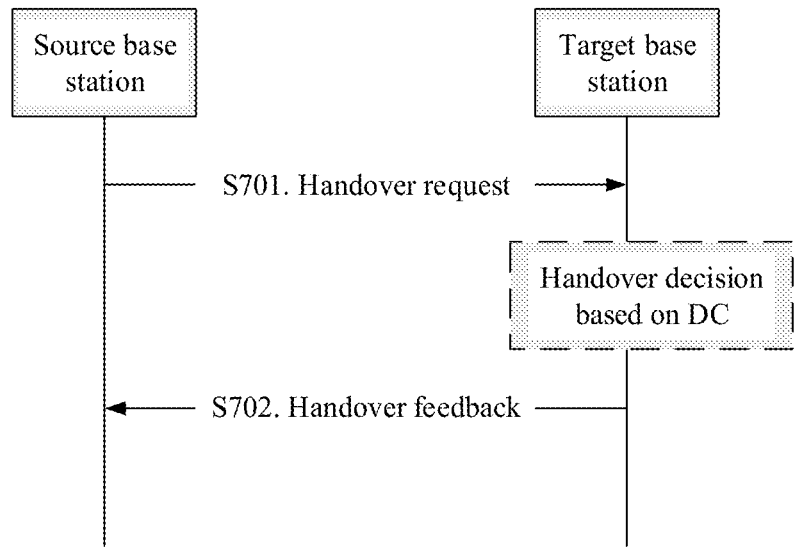
FIG. 6 is another schematic flowchart of a DC-based handover according to this application.

FIG. 6 is another schematic flowchart of a DC-based handover according to this application. As shown in FIG. 6, a handover method includes the following operations.

S701. A target base station receives a handover request sent by a source base station.

In one embodiment, the handover request carries a GTP tunnel port identifier, of the source base station, that is based on each drb. The GTP tunnel port identifier, of the source base station, that is based on each drb is the same as the GTP tunnel port identifier, of the source base station, that is based on each drb in S502. Refer to the description of the GTP tunnel port identifier, of the source base station, that is based on each drb in S502. Details are not described herein again.

In one embodiment, the handover request carries a handover type identifier, and the handover type identifier is used to indicate that a handover is a DC-based handover. The handover type identifier is the same as the handover type identifier in S502. Reference may be made to the description of the identifier in S502. Details are not described herein again.

In one embodiment, the handover request may carry a UE-AMBR, and the target base station obtains a source base station UE-AMBR based on the UE-AMBR carried in the handover request.

In one embodiment, the handover request may further carry network slice information. The network slice information is the same as the network slice information in S502, and is not described in detail herein again. For details, refer to the description of the network slice information in S502.

S702. The target base station sends a handover request feedback based on the handover request, where the handover request feedback carries the source base station UE-AMBR, and the source base station UE-AMBR is obtained by the target base station in advance. The target base station obtains the source base station UE-AMBR based on a UE-AMBR carried in the received handover request sent by the source base station, and a received measurement report and/or received resource use status of the target base station that are sent by the source base station. The target base station establishes a connection to UE based on a target base station UE-AMBR, and the source base station maintains a connection to the source base station based on the source base station UE-AMBR. For example, it is assumed that the UE-AMBR is 90 (bps). According to the measurement report, current spectral efficiency of the target base station is twice that of the source base station. In this case, the source base station obtains that there is a 2:1 relationship between the target base station UE-AMBR and the source base station UE-AMBR, to be specific, the target base station UE-AMBR is 60 (bps), and the source base station UE-AMBR is 30 (bps). For another example, the target base station may also obtain, based on a current resource usage status, a target base station UE-AMBR that is 20 (bps) and that can be provided by the target base station for the UE, and in this case the target base station determines that the source base station UE-AMBR is 20 (bps) and the target base station UE-AMBR is 70 (bps). Through coordination by the target base station, a case in which the target base station and the source base station separately perform independent scheduling and the UE-AMBR is exceeded (where for example, the UE-AMBR is 50 (bps); and if the target base station does not know the case, the target base station allocates 40 (bps) to the UE, that is, the target base station UE-AMBR is 40 (bps), the source base station allocates 20

(bps) to the UE, that is, the source base station UE-AMBR is 20 (bps), and consequently, a sum of the two is finally greater than 50 (bps)) is avoided. Coordinating the UE-AMBR by using the source base station ensures a smooth DC-based handover.

In one embodiment, the handover request feedback further carries a handover type identifier that is used to indicate that the handover is a DC-based handover. It may be understood that, when the handover request in S701 does not include indication information, the target base station may determine, based on a received UE capability, whether to use the DC-based handover, and a type of DC used for the handover. In addition, a determining result is sent to the source base station by using the handover request feedback, to notify the source base station that a DC-based handover is used for this handover or further notify the source base station of the type of DC that this handover is based on. The target base station obtains, based on a UE capability sent by the source base station, whether the UE supports DC, and if the UE supports the DC, the target base station may determine to perform a DC-based handover; or if the UE does not support the DC, a DC-based handover cannot be performed. Whether to use a DC-based handover is determined by using the target base station, thereby improving flexibility of a handover. A specific DC type is the same as the description of the DC in S502. Refer to the description in S502. Details are not described herein again.

In one embodiment, the handover request feedback further carries a GTP tunnel port identifier, of the target base station, that is based on each drb. The GTP tunnel port identifier, of the target base station, that is based on each drb is the same as the GTP tunnel port identifier, of the target base station, that is based on each drb in S503. Refer to the description in S503. Details are not described herein again.

In one embodiment, after S702, S703 may be included: The source base station sends a handover message to the UE. S703 is the same as S504. For details, refer to the description in S504. Details are not described herein again.

According to the foregoing handover procedure, the target base station coordinates a UE capability between the source base station and the target base station, and explicitly specifies a handover type. Therefore, a handover latency is reduced, and a DC-based handover is comprehensively improved in a plurality of aspects.

Figure 7:
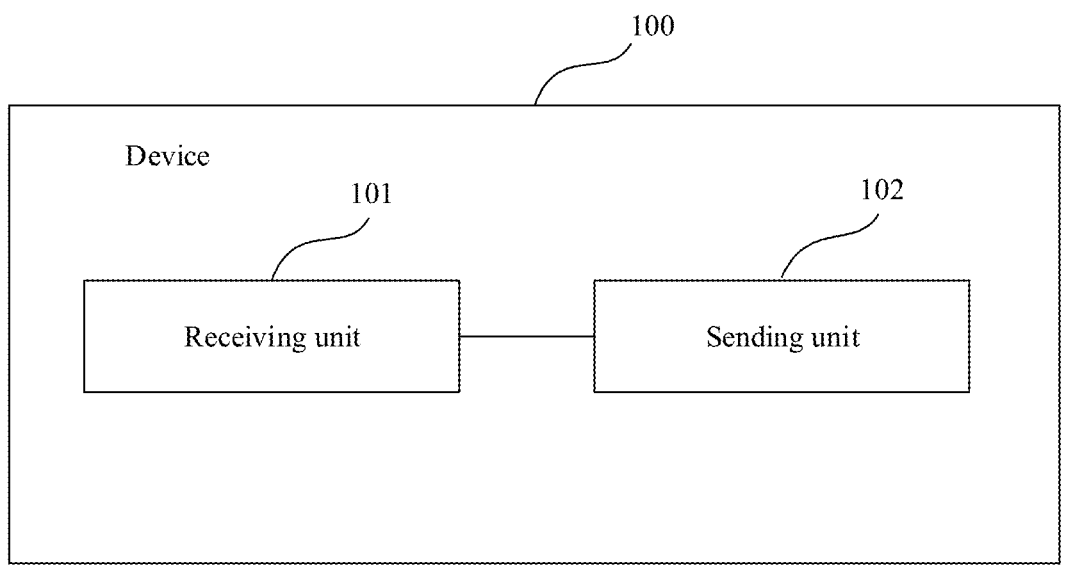
FIG. 7 is a schematic structural diagram of a device 100 according to this application.

Division of functional units may be performed on the source base station, the target base station and the UE based on the foregoing method examples. For example, the functional units may be divided to correspond to the functions, or two or more functions may be integrated into one unit. All or some of the foregoing integrated units may be implemented by using software, hardware, firmware, or any combination thereof. It should be noted that, in this application, unit division is exemplary, and is merely a logical function division. In actual implementation, another division manner may be used. FIG. 7 is a schematic structural diagram of a device 100 according to this application. The device 100 may be applied to implement a source base station, a target base station, or UE in this application. Referring to FIG. 7, the device 100 includes a receiving unit 101 and a sending unit 102. When the device 100 is configured to implement a function of the source base station, the receiving unit 101 is configured to receive a handover request feedback sent by the target base station, and the sending unit 102 is configured to send a handover request to the target base station. When the device 100 is configured to implement a function of the target base station, the receiving unit 101 is configured to receive a handover request sent by the source base station, and the sending unit 102 is configured to send a handover request feedback to the target base station. When the device 100 is configured to implement a function of the UE, the sending unit 102 is configured to send a measurement report to the source base station, and the receiving unit 101 is configured to receive a handover message sent by the source base station.

When the source base station and/or the target base station are implemented in a form of hardware, for a concept, an explanation, a detailed description, a method, a procedure, an operation, and the like that are related to this application and that are provided for the source base station and/or the target base station, refer to descriptions about the content in the foregoing embodiments. In this application, the receiving unit may be implemented by using a communications interface, a receiver, a receiving circuit, or the like. The sending unit may be implemented by using a communications interface, a transmitter, a sending circuit, or the like. It should be understood that functions of the receiving unit and the sending unit may be integrated together, and are implemented by a communications interface, a transceiver, and a transceiver circuit. The communications interface is a collective term, and may include one or more interfaces.

It may be understood that the foregoing description is only a simplified example of a hardware form. In actual application, hardware for implementing the source base station, the target base station, or the UE is not limited to the foregoing structure. For example, the hardware may further include a processor, a memory, an antenna array, a duplexer, and a baseband processing part. The processor may be a central processing unit (CPU), a general-purpose processor, a digital signal processor (DSP), an application-specific integrated circuit (ASIC), a field programmable gate array (FPGA), or another programmable logic device, a hardware component, or a combination thereof. Alternatively, the processor may be a combination of processors implementing a computing function, for example, a combination of one or more microprocessors, or a combination of the DSP and a microprocessor, and or the like. The memory may be disposed in the processor, or may exist independently. The duplexer is configured to implement the antenna array and is configured to send and receive signals. The transmitter is configured to implement conversion between a radio frequency signal and a baseband signal. The transmitter may usually include a power amplifier, a digital-to-analog converter, and a frequency converter, and the receiver may usually include a low-noise amplifier, an analog-to-digital converter, and a frequency converter. The receiver and the transmitter may be collectively referred to as a transceiver sometimes. The baseband processing part is configured to: process a sent or received signal, for example, layer mapping, preceding, modulation/demodulation, and encoding/decoding, and separately process a physical control channel, a physical data channel, a physical broadcast channel, a reference signal, and the like. In an implementation, it may be considered that functions of the receiver and the transmitter may be implemented by using a transceiver circuit or a dedicated transceiver chip. It may be considered that the processor may be implemented by using a dedicated processing chip, a processing circuit, a processor, or a general-purpose chip. In another implementation, program code used to implement functions of the processor, the receiver, and the transmitter is stored in the memory. A general-purpose processor implements the functions of the processor, the receiver, and the transmitter by executing the code in the memory.

Figure 8:
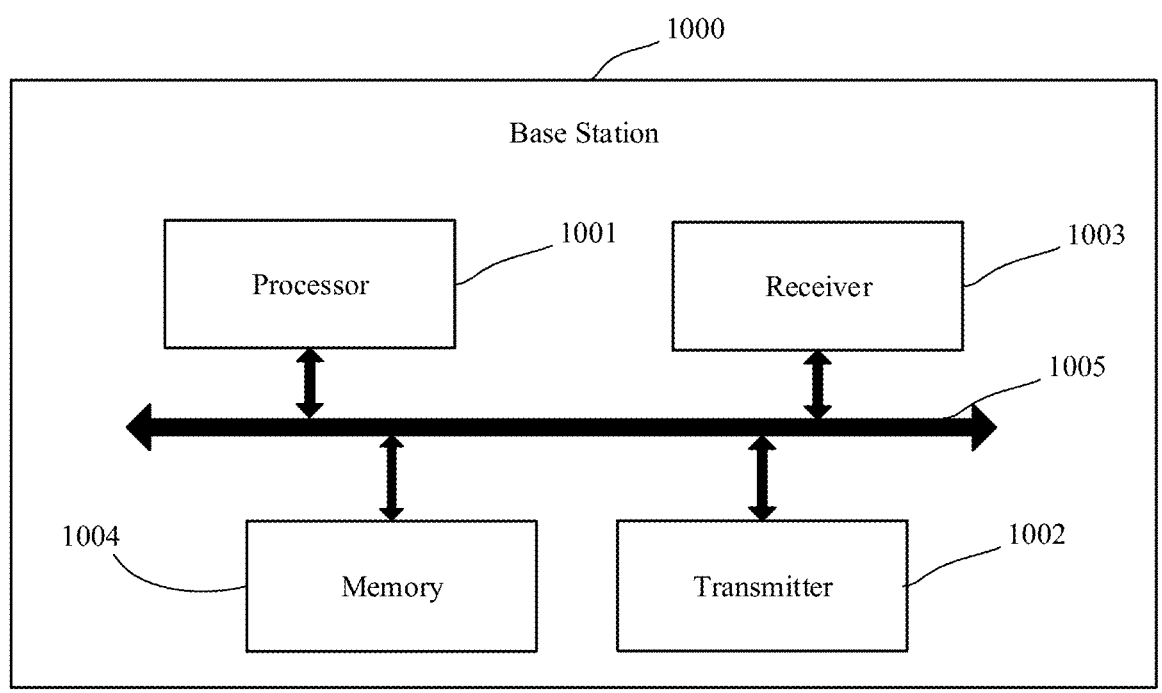
FIG. 8 is a schematic structural diagram of a base station 1000 according to this application.

For example, for an implementation of the source base station or the target base station, refer to FIG. 8. As shown in FIG. 8, a base station 1000 is provided, and includes a processor 1001, a memory 1004, a receiver 1003, and a transmitter 1002. The receiver 1003 and the transmitter 1002 are configured to communicate with another network element. The memory 1004 is configured to store a program that can be executed by the processor 1001, and the program includes instructions used to implement the methods, the operations, or the procedures described in the foregoing embodiments. For a specific method, process, operation, beneficial effect, and the like, refer to description about the content in the foregoing embodiments. Details are not described herein.

Figure 9:
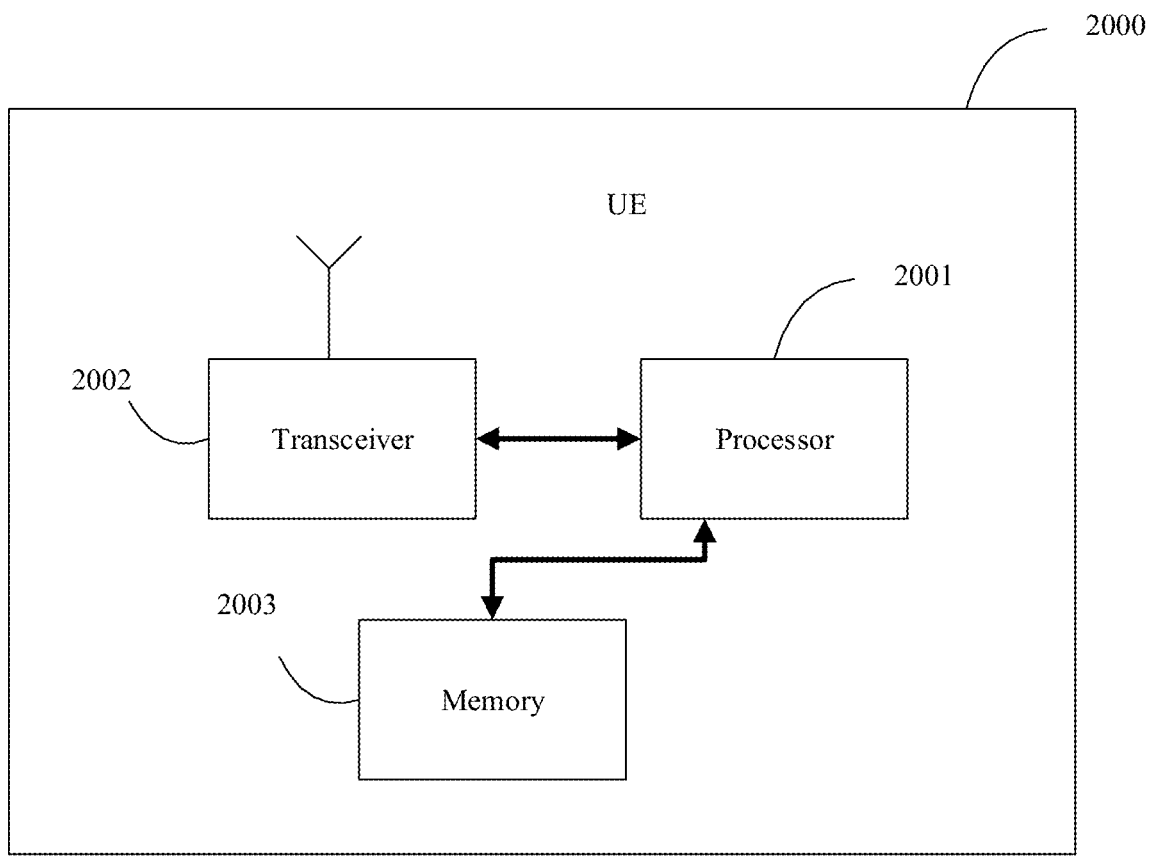
FIG. 9 is a schematic structural diagram of UE 2000 according to this application.

For example, for an implementation of the UE, refer to FIG. 9. As shown in FIG. 9, UE 2000 is provided, and includes a processor 2001, a memory 2003, and a transceiver 2002. The transceiver 2002 is configured to communicate with another network element (may communicate with the another network element by using an antenna). The memory 2003 is configured to store a program that can be executed by the processor 2001, and the program includes instructions used to implement the methods, the operations, or the procedures described in the foregoing embodiments. For a specific method, process, operation, beneficial effect, and the like, refer to description about the content in the foregoing embodiments. Details are not described herein.

When the source base station, the target base station, or the UE is implemented by using software, for a concept, an explanation, a detailed description, and another operation that are related to this application and that are provided for the source base station, the target base station, or the UE, refer to descriptions about the content in the foregoing methods. The method in this application may be implemented specifically or partially in a form of a computer program product. The computer program product includes one or more computer instructions. When the computer program instructions are loaded and executed on a computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like. The storage medium may be integrated in a device, a module, or a processor, or may be disposed separately.

According to the method provided in this application, this application further provides a communications system, including the foregoing source base station, target base station, and UE. Alternatively, this application provides a communications system, including the source base station and the target base station.

Obviously, a person skilled in the art may make various modifications and variations to this application without departing from the scope of this application. This application is intended to cover these modifications and variations of this application provided that they fall within the scope of protection defined by the following claims and their equivalent technologies.

What is claimed is:

1. A handover method based on dual connectivity (DC), comprising:
   sending, by a source base station, a handover request to a target base station, wherein the handover request carries a target base station user equipment (UE) aggregate maximum bit rate (UE-AMBR) which is a first portion of a UE-AMBR being an AMBR during a communication between the target base station and the UE, wherein a source base station UE-AMBR is a second portion of the UE-AMBR being an AMBR during a communication between the source base station and the UE, wherein the UE maintains a connection to the source base station while establishing a connection to the target base station, and wherein a sum of the target base station UE-AMBR and the source base station UE-AMBR does not exceed the UE-AMBR through coordination by the source base station during a DC handover; and
   receiving, by the source base station, a handover request feedback sent by the target base station.

2. The handover method according to claim 1, wherein the target base station UE-AMBR is obtained by the source base station based on a received UE-AMBR.

3. The handover method according to claim 1, wherein the handover request further carries network slice information of UE,
   wherein the network slice information comprises an allowed network slice indicator or a supported largest quantity of network slices.

4. The handover method according to claim 3, wherein, the allowed network slice indicator is used to indicate at least one network slice that a network side allows the UE to access in a registration area or a tracking area to which a source cell belongs; and
   wherein the supported largest quantity of network slices is a largest quantity of network slices supported by the UE or a largest quantity of network slices that are capable of being simultaneously accessed by the UE.

5. The handover method according to claim 1, wherein the handover request further carries at least one of a handover type identifier, a GPRS tunneling protocol (GTP), or a GTP tunnel port identifier of the target base station, wherein the GTP tunnel port identifier is based on each data radio bearer (drb), and wherein the handover type identifier is used to indicate that a handover is a DC-based handover.

6. The handover method according to claim 1, wherein the handover request feedback carries a GTP tunnel port identifier of the target base station, and wherein the GTP tunnel port identifier is based on each drb.

7. The handover method according to claim 1, wherein after the receiving, by the source base station, a handover request feedback sent by the target base station, the handover method further comprises:
   sending, by the source base station, a handover message to the UE, wherein the handover message carries one or more of the following information: a handover type identifier, timing information, or trigger information, wherein the handover type identifier is used to indicate that a handover is a DC-based handover, wherein the timing information is used to instruct the UE to release a connection to the source base station after a preset time, and wherein the trigger information is used to indicate a trigger condition of releasing, by the UE, the connection to the source base station.

8. A base station supporting a dual connectivity (DC) handover, wherein the base station comprises: a receiver, a transmitter, a memory, and a processor, wherein the memory stores an instruction, and when the processor executes the instruction, the following operations are performed:
    sending, by the transmitter, a handover request to a target base station, wherein the base station includes a source base station, wherein the handover request carries a target base station user equipment (UE) aggregate maximum bit rate (UE-AMBR) which is a first portion of a UE-AMBR being an AMBR during a communication between the target base station and a UE, wherein a source base station UE-AMBR is a second portion of the UE-AMBR being an AMBR during a communication between the source base station and the UE, wherein the UE maintains a connection to the source base station while establishing a connection to the target base station, and wherein a sum of the target base station UE-AMBR and the source base station UE-AMBR does not exceed the UE-AMBR through coordination by the source base station during a DC handover; and
    receiving, by the receiver, a handover request feedback sent by the target base station.

9. The base station according to claim 8, wherein the target base station UE-AMBR is obtained by the processor based on a UE-AMBR received by the receiver.

10. The base station according to claim 8, wherein the handover request further carries network slice information of UE,
    wherein the network slice information comprises an allowed network slice indicator or a supported largest quantity of network slices.

11. The base station according to claim 10, wherein the allowed network slice indicator is used to indicate at least one network slice that a network side allows the UE to access in a registration area or a tracking area to which a source cell belongs; and
    wherein the supported largest quantity of network slices is a largest quantity of network slices supported by the UE or a largest quantity of network slices that are capable of being simultaneously accessed by the UE.

12. The base station according to claim 8, wherein the handover request further carries at least one of a handover type identifier, a GPRS tunneling protocol (GTP), or a GTP tunnel port identifier of the target base station, wherein the GTP tunnel port identifier is based on each data radio bearer (drb), and wherein the handover type identifier is used to indicate that a handover is a DC-based handover.

13. The base station according to a claim 8, wherein the handover request feedback carries a GTP tunnel port identifier of the target base station, wherein the GTP tunnel port identifier is based on each drb.

14. The base station according to claim 8, wherein the transmitter is further configured to send a handover message to the UE.

15. The base station according to claim 8, wherein after the receiving, by the receiver, a handover request feedback sent by the target base station,
    the transmitter is further configured to send a handover message to the UE, wherein the handover message carries one or more of the following information: a handover type identifier, timing information, or trigger information, wherein the handover type identifier is used to indicate that a handover is a DC-based handover, wherein the timing information is used to instruct the UE to release a connection to the source base station after a preset time, and wherein the trigger information is used to indicate a trigger condition of releasing, by the UE, the connection to the source base station.

16. A base station performing a handover based on dual connectivity (DC), wherein the base station comprises: a receiver, a transmitter, a memory, and a processor, wherein the memory stores an instruction, and when the processor executes the instruction, the following operations are performed:
    receiving, by the receiver, a handover request sent by a source base station; and
    sending, by the transmitter, a handover request feedback to the source base station based on the handover request, wherein the handover request feedback carries a source base station user equipment (UE) aggregate maximum bit rate (UE-AMBR) which is a second portion of the UE-AMBR being an AMBR during a communication between the source base station and the UE, wherein the base station includes a target base station, wherein a target base station UE-AMBR is a first portion of a UE-AMBR being an AMBR during a communication between the target base station and a UE, wherein the UE maintains a connection to the source base station while establishing a connection to the target base station, and wherein a sum of the target base station UE-AMBR and the source base station UE-AMBR does not exceed the UE-AMBR through coordination by the target base station during a DC handover.

17. The base station according to claim 16, wherein the handover request carries at least one of a handover type identifier, a GPRS tunneling protocol (GTP), or a GTP tunnel port identifier of the source base station, wherein the GTP tunnel port identifier is based on each data radio bearer (drb), and wherein the handover type identifier is used to indicate that a handover is a DC-based handover.

18. The base station according to claim 16, wherein the handover request feedback further carries at least one of a handover type identifier or a GTP tunnel port identifier of the target base station, wherein the GTP tunnel port identifier is based on each drb, and wherein the handover type identifier is used to indicate that a handover is a DC-based handover.

19. The base station according to claim 18, wherein the handover type identifier is determined by the processor based on a UE capability.

20. The base station according to claim 16, wherein the source base station UE-AMBR is obtained by the processor based on a UE-AMBR that is received by the receiver and sent by the source base station or the UE.

* * * * *